Dec. 13, 1938.  M. A. DALOTEL  2,139,806
MACHINE FOR THE CONTINUOUS PRINTING OF NEGATIVE FILMS
ON A PLURALITY OF POSITIVES AT THE SAME TIME
Filed Aug. 4, 1936  3 Sheets-Sheet 1

Dec. 13, 1938.  M. A. DALOTEL  2,139,806
MACHINE FOR THE CONTINUOUS PRINTING OF NEGATIVE FILMS
ON A PLURALITY OF POSITIVES AT THE SAME TIME
Filed Aug. 4, 1936  3 Sheets-Sheet 2
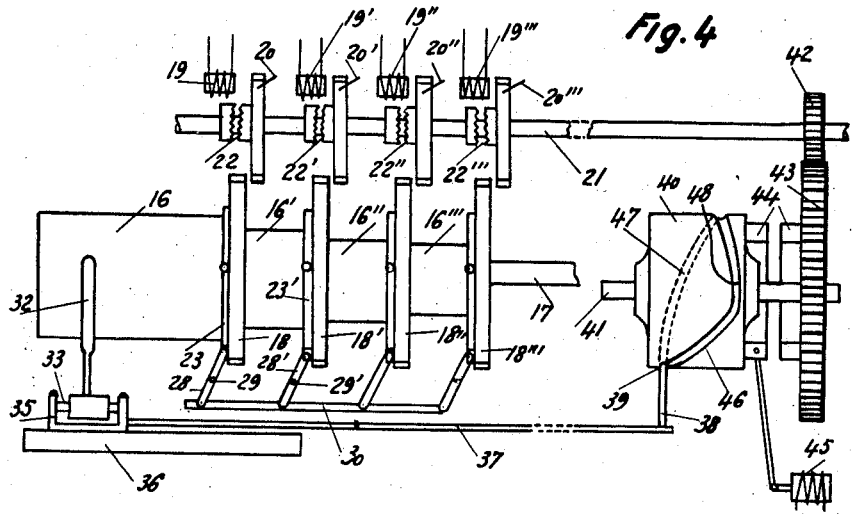
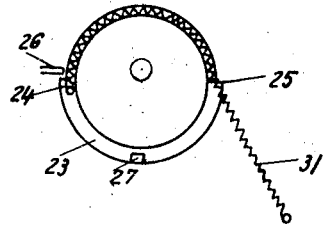
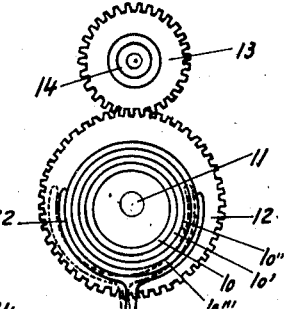
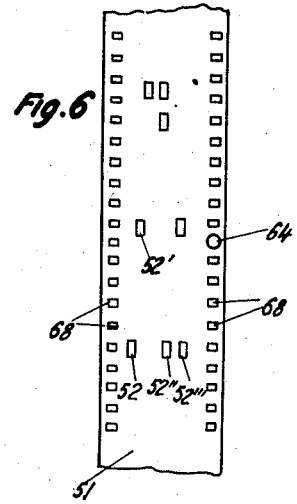
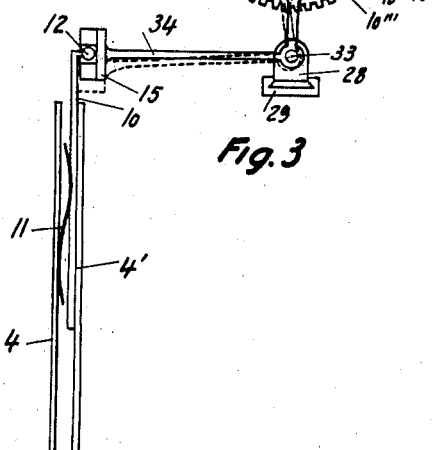

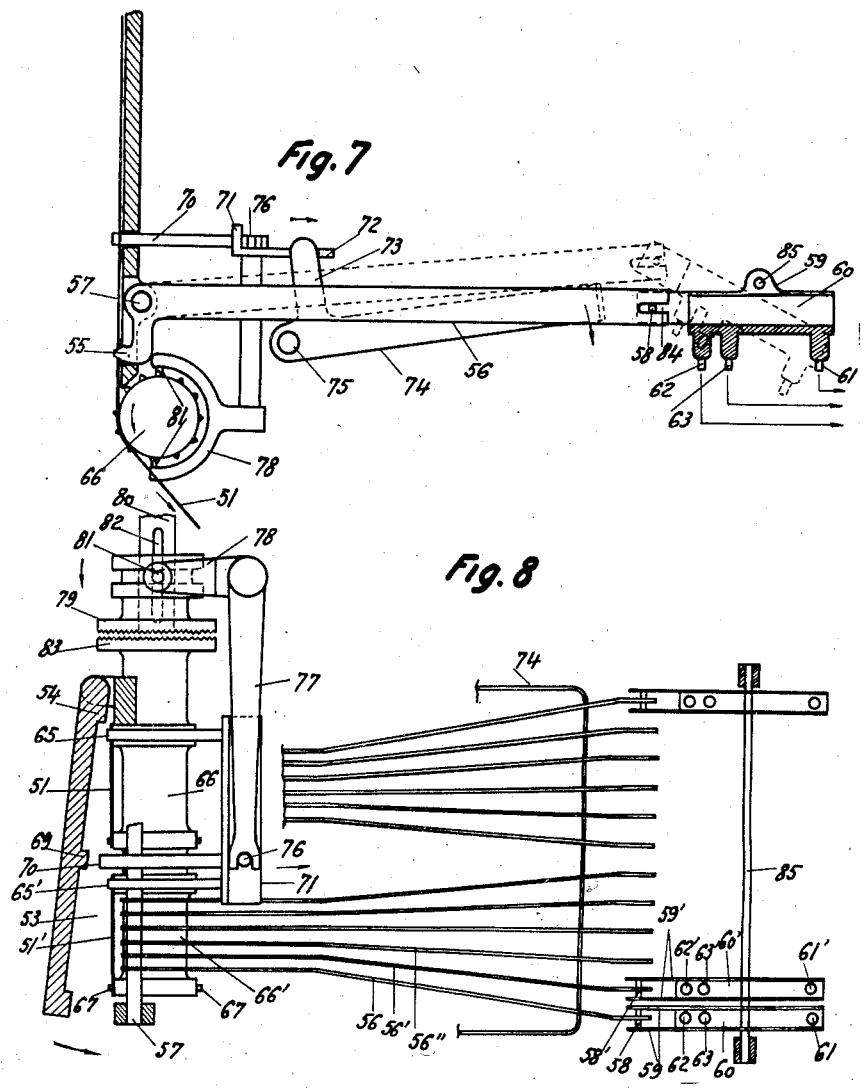

Patented Dec. 13, 1938

2,139,806

UNITED STATES PATENT OFFICE 2,139,806

MACHINE FOR THE CONTINUOUS PRINTING OF NEGATIVE FILMS ON A PLURALITY OF POSITIVES AT THE SAME TIME

Maurice Albert Dalotel, Colombes, France, assignor to Suzanne Rosalie Mathot, Paris, France Application August 4, 1936, Serial No. 94,172
In France August 8, 1935

11 Claims. (Cl. 88—24)

The present invention relates to a machine for the continuous printing by projection of one or a plurality of negative films on a plurality of positives at the same time, of the type diagrammatically illustrated in Fig. 1 of the accompanying drawings in which the negative films, for example, picture negative 1 and a sound negative 2, as well as the positives 3, 3', 3'' . . . etc. are arranged side by side behind a plate 4 and fed with a continuous movement, optical projection systems (not shown) composed of prisms and lenses being arranged to project respectively on each positive, through the windows such as 5, 5', 5'' . . . etc., or 6, 6', 6'' . . . etc. of the plate 4, different zones near the negative or negatives being respectively in register with the windows 7, 7', 7'' . . . etc., or 8, 8', 8'' . . . etc., of the said plate.

It has already been proposed in machines of this kind to use for illuminating the negative film or films such as 1, 2, a lamp of fixed intensity and to adjust the illumination, or more correctly the time of exposure, by a mechanical means, for example by means of a plate placed behind the windows 7, 7', 7''. . . etc., or 8, 8', 8'' etc., and provided with corresponding windows, said second plate being adapted to be displaced variable amounts, so as to more or less close the windows 7, 7', 7'' and 8, 8', 8''. However, in this device the adjustment of all the windows corresponding to the various zones near the negative or negatives which are simultaneously projected on the various positives is effected at the same time, so that, on the various positives, the change of light does not appear on the same part of the strip.

The device according to the present invention has for its object to overcome this drawback and it is characterized by the fact that it comprises movable screens which are independent of each other, arranged behind the projecting windows of the negative films, and means for successively controlling the displacements of said screens in synchronism with the unwinding of the negative films.

By way of example, an embodiment of the device according to the invention has been described hereinafter and illustrated in the accompanying drawings.

Fig. 3 is a side elevation thereof.

Fig. 4 is an elevation of the members controlling the displacements of the movable screens.

Fig. 5 is an end view of one of said members.

Fig. 6 shows a pilot strip and

Figs. 7 and 8 respectively show in elevation and in plan view the members by means of which said pilot strip automatically produces the variations of illumination.

Figure 1:
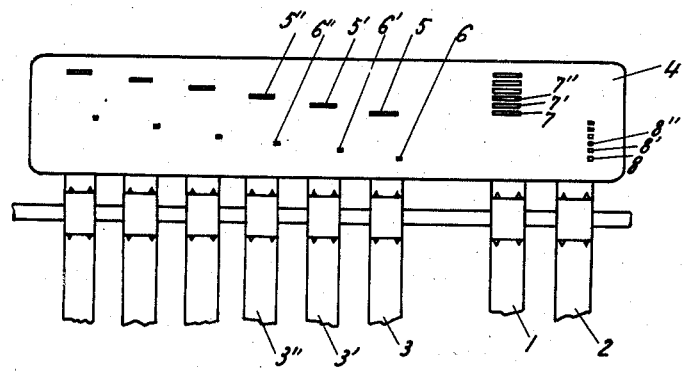
Fig. 1 shows diagrammatically a complete printing machine of the above referred to type.
Figure 2:
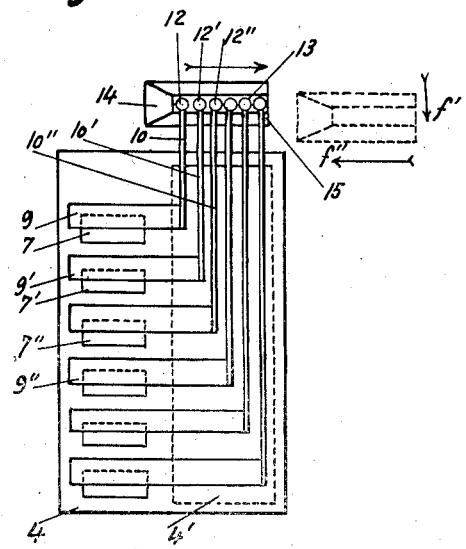
Fig. 2 is a front elevation of the adjusting screens of a negative film.

Referring to Figs. 2 and 3, it will be seen that the device comprises as above mentioned, a fixed plate 4 having, for each negative as many windows 7, 7', 7'' etc. as there are positives to be printed. In front of said windows movable screens 9, 9', 9'' etc. carried by rods 10, 10', 10'' etc. can be displaced, and are held with running friction between the plate 4 and a second covering plate 4', for example by means of weak spring blades 11 fixed to each of said rods. At the ends of said rods 10 are laterally fixed projections 12, 12', 12'' etc. having spherical heads, which engage in a groove 13 having a flared end 14 provided in a movable grooved member 15 serving as a guide.

When a change of light takes place, the member 15 is displaced first towards the right in the direction of the arrow 7, by means which will be described hereinafter, so as to disengage the heads 12 of the rods 10 which remain stationary owing to the friction produced by the springs 11. The member 15 is then displaced vertically in the direction of the arrow f', as shown in dotted lines in Fig. 2, the amount which the screens 9 are to be displaced and then brought back towards the left in the direction of the arrow f'', one of the edges of the flared end 14 of the groove 13 successively engaging during this return movement the heads 12 of the rods 10 so as to displace the screens 9 one after the other in synchronism with the unwinding of the film.

The vertical displacement of the member 15 is obtained by means of the members shown in Figs. 3 and 4:

Eccentric sleeves 16, 16', 16'', fitted to each other are loosely mounted on a fixed shaft 17. Each of said sleeves carries a pinion 18, 18', 18'' which can be respectively brought into mesh, by means of electro-magnets 19, 19', 19'', with the pinions 20, 20', 20'' etc. mounted with a rubbing fit on a constantly rotating drive shaft 21; said pinions can be brought into mesh with the pinions 18, 18', 18'' etc. by means of the clutches 22, 22', 22'' etc. actuated by the aforesaid electro-magnets 19. Each of the sleeves is provided with a plate 23 (Fig. 5) having two abutments 24, 25 which impinge on a projection 26 secured to the frame so as to prevent the sleeves from rotating more than one half a revolution; the plate 23 has furthermore a recess 27 in which engages the end of a lever 28 (Fig. 4) pivoted at 29 which normally prevents the sleeve from rotating; all the levers 28 of the sleeves 16 are connected to each other by a coupling rod 30. Finally, a retracting spring 31 returns the sleeve to its inoperative position as soon as the actuating pinions come out of mesh.

On the outer sleeve 16 is mounted a fork 32 pivoted on a pin 33 and secured to a lever 34 which carries the grooved member 15 actuating the screen supporting rods 10. The pin 33 is mounted in a carriage 35 which is adapted to be displaced in parallel relation to the shaft 17 in a slide 36. Said carriage 35 is secured to a rod 37 carrying at its end a finger 38 engaged in a groove 39 provided in a drum 40 loosely mounted on a shaft 41 which is constantly rotated by the drive shaft 21 through the instrumentality of pinions 42, 43. The drum 40 can be secured to the shaft 41 by means of a clutch 44 controlled by the electro-magnet 45.

The groove 39 has two spiral portions of different and opposite pitch 46, 47 which are separated by a circular portion 48 extending perpendicularly to the generatrix of the drum.

The operation of the device is as follows:

When a change of light takes place a pilot strip effects, in the manner which will be described hereinafter, through the instrumentality of the electro-magnets 19, 19', 19'' etc. and 45 respectively, the engagement of the clutches 22, 22', 22'' etc. and of the clutch 45 of the drum 40. The sleeves 16, 16', 16'' etc. are prevented from rotating for the time being by the locking levers 28, 28', 28'', etc. The rotation of the cam drum 40 causes, by means of the spiral section 46 of the groove 39, a displacement towards the right of the carriage 35 and consequently of the member 15 (Figs. 2 and 3) which thereby releases the heads 12 of the screen supporting rods 10. When the finger 38 comes into the section 48 of the groove 39, the carriage 35 impinges on the end of the coupling rod 30 of the locking levers 28 which swing towards the left releasing the sleeves 16, so that those of said sleeves which have been engaged with the drive shaft 21 rotate half a revolution while the carriage 35 remains at the dead centre. The rotation of the eccentric sleeves 16 causes the fork 32 to swing towards the right or left (Fig. 3 in dotted lines) and consequently the end of the lever 34 and the grooved member 15 carried by said lever to be displaced upwardly or downwardly. The amount of the vertical displacement of the member 15 and consequently that of the variation of illumination therefore depends on the number of sleeve 16 which have been caused to rotate. Then, the spiral section 47 of the groove 39 of the drum 40 causes the carriage 35 to return to its initial position and consequently the displacement towards the left of the member 15 the groove 13 of which successively acts with its flared end 14 on the screen supporting rods 10, as has already been mentioned.

The pitch of the spiral section 47 of the groove 39 of the drum 40 and the speed of the latter are calculated in such a manner that the successive action of the member 15 on the screens 9 is synchronous with the unrolling of the film, so that each screen 9 is actuated when the same zone of the negative passes in front of the corresponding window 7 of the plate 4.

After the drum 40 has rotated one revolution, the clutch 44 of the latter is automatically released and the drum 40 remains inoperative until the following change of light.

Those of the clutches 22, 22', 22'' which have been engaged remain engaged; when the following change of light takes place, which will necessitate another combination of eccentric sleeves, certain of the clutches 22, 22', 22'' ... etc. which have been previously engaged, will be released, and the retracting springs 31 will return the corresponding sleeves to the inoperative position.

The illumination adjustment device according to the invention has been described, for greater simplicity for a single negative. In the event of the printing machine being intended to simultaneously project a plurality of negatives such as pictures, words, music, noise, the device is multiplied as many times as there are negatives, each of the devices thus constituted being controlled by a special pilot strip.

Fig. 6 shows a pilot strip 51 of this kind comprising notches such as 52, 52' etc., the number of juxtaposed notches on the same transverse row corresponding to the number of eccentric sleeves 16, 16' etc. which are to be brought into place at a given time.

In Figs. 7 and 8 a device has been shown by way of example for automatically controlling the illumination of two negatives, for example pictures and sounds, and comprising for this purpose two pilot strips 51, 51' passing in a passage 53 closed by a door 54. On each pilot strip, levers 56, 56', 56'' etc. bear with their bent and tapered ends 55, the number of said levers being equal to that of the eccentric sleeves 16, 16', 16'' etc. of Fig. 4, said levers being all pivoted about a common pin 57. At their ends opposite the pilot strips 56, 56', 56'' etc. are pivoted by means of grooves 84, 84', 84'' and and projections 58, 58', 58'' with the supports 59, 59', 59'' ... of the mercury trips 60, 60', 60'' etc. pivoted about the common pin 85, each of said trips having a current inlet terminal 61, 61', 61'' and two outlet terminals 62, 62', 62'' and 63, 63', 63'' etc.: the terminals 62, 62', 62'' are respectively connected to the electro-magnets 19, 19', 19'' etc. actuating the clutch of the eccentrics 16, 16', 16'' etc. (Fig. 4) whereas the terminals 63, 63', 63'' are all connected to the electro-magnet 45 actuating the clutch of the cam drum 40.

The operation of this device is as follows:

When a notch such as 52 of the pilot strip 51 comes opposite the end 55 of a lever 56, the latter, which is no longer supported by the pilot strip, falls (position shown in full lines in Fig. 7), and the corresponding trip 60 sends current into the electro-magnet 19 of the corresponding eccentric 16 and into the electro-magnet 45 of the cam drum 40 actuating the illumination adjustment device in the manner hereinbefore described. Then, the edge of the notch 52 of the pilot strip which is displaced and acts on the end 55 of the lever 56, moves the latter upwardly (position in dotted lines in Fig. 7) and the trip cuts off the current. If slots 52, 52', 52'' are arranged on the row of the pilot strip 51, a plurality of levers 56 and consequently a plurality of eccentrics 60 will be brought into play.

For placing them in position, the pilot strips 51 have a round perforation 64 which is engaged on one of the pins 65, 65' projecting from the passage 53 when the door 54 is open. At this time, the levers 56 are raised and the feed drums 66, 66' of the strips 51, 51' are loose on their pins 80, so that their teeth 67 can accurately engage in the lateral perforations 68 of the pilot strips. When the door 54 is closed, the projection 69 provided on its inner face pushes the rod 70 and the angle piece 71 carrying the pins 65, 65' which move backwards and release the pilot strips. The angle piece 71 is provided with an appendix 72 in engagement with a finger 73 secured to a stirrup 74 pivoted at 75 and supporting the levers 56, 56', 56''. When the angle piece 71 moves backwards as the door 54 closes, the stirrup 74 moves downwards, thereby enabling the levers 56 to move downwardly when the notches 52 of the strips 51, 51' pass.

The angle piece 71 furthermore carries a tenon 76 displacing the arm 77 actuating a fork 78 which causes the clutch member 79 to slide on the shaft 80 by means of the tenons 81 and the grooves 82 so as to engage the clutch 79—83 and automatically secure the feed drums 66 to their shaft 80 when the door 54 closes.

I claim:

1. In a machine for the continuous printing by projection of negative films on a plurality of positive films at the same time, a device for regulating the illumination comprising a single source of light, a fixed plate provided in front of each negative with as many narrow windows as there are positives to be printed and arranged one above the other for simultaneously projecting on each positive different adjacent regions of the negative, separate movable screens independent of each other arranged behind each of said windows, and common control means for successively displacing said screens in synchronism with the unwinding of the negative film.

2. In a machine for the continuous printing by projection of negative films on a plurality of positive films at the same time, a device for regulating the illumination comprising a single source of light, a fixed plate provided in front of each negative with as many narrow windows as there are positives to be printed and arranged one above the other for simultaneously projecting on each positive different adjacent regions of the negative, separate movable screens independent of each other arranged behind each of said windows, rods arranged parallel to the direction of unwinding of the film and respectively connected to said screens, a movable member successively acting on the ends of said rods in synchronism with the unwinding of the negative film.

3. In a machine for the continuous printing by projection of negative films on a plurality of positive films at the same time, a device for regulating the illumination comprising in front of each negative film a plate provided with as many windows for projection arranged one above the other as there are positives to be printed, movable screens independent of each other arranged behind said windows, rods arranged parallel to the direction of unwinding of the film and respectively secured to the said screens, a second plate, leaf springs secured to the said rods for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely and parallel to the direction of unwinding of the film.

4. In a machine for the continuous printing by projection of negative films on a plurality of positive films at the same time, a device for regulating the illumination comprising in front of each negative film a plate provided with as many windows for projection arranged one above the other as there are positives to be printed, movable screens independent of each other arranged behind said windows, rods arranged parallel to the direction of unwinding of the film and respectively secured to the said screens, a second plate, leaf springs secured to the said rods for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely to the direction of unwinding of the film so as to disengage said projections, means for displacing said member parallel to the direction of the film, said latter means comprising a plurality of eccentric sleeves freely mounted on each other, and means for displacing said grooved member transversely to the direction of the film so that the spherical projections of the screen supporting rods are successively engaged by the flared end of the groove.

5. In a machine for the continuous printing by projection of negative films on a plurality of positive films at the same time, a device for regulating the illumination, comprising, in front of each negative film, a plate provided with as many windows for projection arranged one above the other as there are positives to be printed, movable screens independent of each other arranged behind said windows, rods arranged parallel to the direction of unwinding of the film and respectively secured to the said screens, a second plate, leaf springs secured to the said rods for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely and parallel to the direction of unwinding of the film, said means comprising a fixed shaft arranged transversely to the direction of unwinding of the film, a plurality of eccentric sleeves fitted onto each other and freely mounted on said shaft, a fork on the outer sleeve, a lever secured to said fork and the end of which is fixed to the grooved member actuating the screen supporting rods, a carriage adapted to be displaced parallel to the sleeve shaft and on which said fork is pivoted, a drum having a groove composed of two spiral sections of opposite pitch connected to each other by a circular section, a finger secured to said carriage and engaged in the groove of said drum, and means for separately rotating the eccentric sleeves and the drum.

6. In a machine for the continuous printing by projection of negative films on a plurality of positive films at the same time, a device for regulating the illumination comprising, in front of each negative film, a plate provided with as many windows for projection arranged one above the other as there are positives to be printed, movable screens independent of each other arranged behind said windows, rods arranged parallel to the direction of unwinding of the film and respectively secured to the said screens, a second plate, leaf springs secured to the said rods for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely and parallel to the direction of unwinding of the film, said means comprising a fixed shaft arranged transversely to the direction of unwinding of the film, a plurality of eccentric sleeves fitted onto each other and freely mounted on said shaft, a fork on the outer sleeve, a lever secured to said fork and the end of which is fixed to the grooved member actuating the screen supporting rods, a carriage adapted to be displaced parallel to the sleeve shaft and on which said fork is pivoted, a drum having a groove composed of two spiral sections of opposite pitch connected to each other by a circular section, a finger secured to said carriage and engaged in the groove of said drum, and pinions respectively secured to the eccentric sleeves and the grooved drum, a constantly rotating drive shaft, pinions mounted on said drive shaft, electro-magnets for separately bringing said latter pinions into mesh with those of the eccentric sleeves and of the grooved drum, locking members for the eccentric sleeves and means for releasing said locking members by means of the displaceable carriage when the grooved member releases the spherical projections of the screen supporting rods.

7. In a machine for the continuous printing by projection of negative films on a plurality of positive films at the same time, a device for regulating the illumination, comprising in front of each negative film, a plate provided with as many windows for projection arranged one above the other as there are positives to be printed, movable screens independent of each other arranged behind said windows, rods arranged parallel to the direction of unwinding of the film and respectively secured to the said screens, a second plate, leaf springs secured to the said rods for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely and parallel to the direction of unwinding of the film, said means comprising a fixed shaft arranged transversely to the direction of unwinding of the film, a plurality of eccentric sleeves fitted onto each other and freely mounted on said shaft, a fork on the outer sleeve, a lever secured to said fork and the end of which is fixed to the grooved member actuating the screen supporting rods, a carriage adapted to be displaced parallel to the sleeve shaft and on which said fork is pivoted, a drum having a groove composed of two spiral sections of opposite pitch connected to each other by a circular section, a finger secured to said carriage and engaged in the groove of said drum, pinions respectively secured to the eccentric sleeves and the grooved drum, a constantly rotating drive shaft, pinions mounted on said drive shaft, electro-magnets for separately bringing said latter pinions into mesh with those of the eccentric sleeves and of the grooved drum, locking members for the eccentric sleeves and means for releasing said locking members by means of the displaceable carriage when the grooved member releases the spherical projections of the screen supporting rods, means for limiting the rotation of the eccentric sleeves to one half a revolution and springs for retracting said sleeves into their initial position as soon as the actuating pinions are disengaged.

8. In a machine for the continuous printing by projection of negative films on a plurality of positive films at the same time, a device for regulating the illumination, comprising in front of each negative film, a plate provided with as many windows for projection arranged one above the other as there are positives to be printed, movable screens independent of each other arranged behind said windows, rods arranged parallel to the direction of unwinding of the film and respectively secured to the said screens, a second plate, leaf springs secured to said rods, for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely and parallel to the direction of unwinding of the film, said means comprising a fixed shaft arranged transversely to the direction of unwinding of the film, a plurality of eccentric sleeves fitted onto each other and freely mounted on said shaft, a fork on the outer sleeve, a lever secured to said fork and the end of which is fixed to the grooved member actuating the screen supporting rods, a carriage adapted to be displaced parallel to the sleeve shaft and on which said fork is pivoted, a drum having a groove composed of two spiral sections of opposite pitch connected to each other by a circular section, a finger secured to said carriage and engaged in the groove of said drum, a perforated pilot strip, and means for separately rotating the eccentric sleeves and the grooved drum by means of said pilot strip.

9. In a machine for the continuous printing by projection of negative films on a plurality of positive films at the same time, a device for regulating the illumination comprising, in front of each negative film, a plate provided with as many windows for projection arranged one above the other as there are positives to be printed, movable screens independent of each other arranged behind said windows, rods arrange parallel to the direction of unwinding of the film and respectively secured to the said screens, a second plate, leaf springs secured to said rods for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely and parallel to the direction of unwinding of the film, said means comprising a fixed shaft arranged transversely to the direction of unwinding of the film, a plurality of eccentric sleeves fitted onto each other and freely mounted on said shaft, a fork on the outer sleeve, a lever secured to said fork and the end of which is fixed to the grooved member actuating the screen supporting rods, a carriage adapted to be displaced parallel to the sleeve shaft and on which said fork is pivoted, a drum having a a groove composed of two spiral sections of opposite pitch connected to each other by a circular section, a finger secured to said carriage and engaged in the groove of said drum, pinions respectively secured to the eccentric sleeves and the grooved drum, a constantly rotating drive shaft, pinions mounted on said drive shaft, electro-magnets for bringing said pinions separately into mesh with those of the eccentric sleeves and of the grooved drum, a perforated pilot strip, a number of levers equal to the number of eccentric sleeves and arranged so as to bear on the pilot strip and to move when a perforation of said pilot strip passes, two electric contacts actuated by each lever and one of which is arranged in the circuit of the electro-magnet of one of the eccentric sleeves and the other in the circuit of the electro-magnet controlling the grooved drum.

10. In a machine for the continuous printing by projection of negative films on a plurality of positive films at the same time, a device for regulating the illumination comprising, in front of each negative film, a plate provided with as many windows for projection arranged one above the other as there are positives to be printed, movable screens independent of each other arranged behind said windows, rods arranged parallel to the directions of unwinding of the film and respectively secured to the said screens, a second plate, leaf springs secured to said rods for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely and parallel to the direction of unwinding of the film, said means comprising a fixed shaft arranged transversely to the direction of unwinding of the film, a plurality of eccentric sleeves fitted onto each other and freely mounted on said shaft, a fork on the outer sleeve, a lever secured to said fork and the end of which is fixed to the grooved member actuating the screen supporting rods, a carriage adapted to be displaced parallel to the sleeve shaft and on which said fork is pivoted, a drum having a groove composed of two spiral sections of opposite pitch connected to each other by a circular section, a finger secured to said carriage and engaged in the groove of said drum, pinions respectively secured to the eccentric sleeves and the grooved drum, a constantly rotating drive shaft, pinions mounted on said drive shaft, electro-magnets for bringing said pinions separately into mesh with those of the eccentric sleeves and of the grooved drum, a perforated pilot strip, a number of levers equal to the number of eccentric sleeves and arranged so as to bear on the pilot strip and to move when a perforation of said pilot strip passes, mercury trips respectively pivoted on each of said levers, each of said mercury trips having one current inlet terminal and two outlet terminals, one of the outlet terminals of each trip being connected to the electro-magnet controlling the corresponding eccentric sleeve and the second outlet terminal of all the trips being connected to the electro-magnet controlling the grooved drum.

11. In a machine for the continuous printing by projection of negative films on a plurality of positive films at the same time, a device for regulating the illumination comprising, in front of each negative film, a plate provided with as many windows for projection arranged one above the other as there are positives to be printed, movable screens independent of each other arranged behind said windows, rods arranged parallel to the direction of unwinding of the film and respectively secured to the said screens, a second plate, leaf springs secured to said rods for holding same with running friction between the plate with windows and said second plate, projections having spherical heads fixed to the ends of said rods, a movable member and in said member a groove having a flared end, arranged transversely to the direction of unwinding of the film and in which are engaged the spherical heads of said projections, means for displacing said grooved member transversely and parallel to the direction of unwinding of the film, said means comprising a fixed shaft arranged transversely to the direction of unwinding of the film, a plurality of eccentric sleeves fitted onto each other and freely mounted on said shaft, a fork on the outer sleeve, a lever secured to said fork and the end of which is fixed to the grooved member actuating the screen supporting rods, a carriage adapted to be displaced parallel to the sleeve shaft and on which said fork is pivoted, a drum having a groove composed of two spiral sections of opposite pitch connected to each other by a circular section, a finger secured to said carriage and engaged in the groove of said drum, a perforated pilot strip, members for feeding said strip, a number of levers equal to the number of eccentric sleeves and arranged so as to bear on the pilot strip and to move when a perforation of said pilot strip passes, two electric contacts actuated by each lever and one of which is arranged in the circuit of the electro-magnet of one of the eccentric sleeves and the other in the circuit of the electro-magnet controlling the grooved drum, and means for locking the levers actuated by the pilot strip and for simultaneously disengaging the members for feeding said strip.

MAURICE ALBERT DALOTEL.